United States Patent
Aubert et al.

(10) Patent No.: US 10,496,513 B2
(45) Date of Patent: Dec. 3, 2019

(54) MEASUREMENT OF COMPUTER PRODUCT USAGE

(71) Applicant: International Business Machines Corporation, Armonk, NY (US)

(72) Inventors: Denis Aubert, St. Paul de Vence (FR); Olivier Oudot, Vallauris (FR); Joaquin Picon, Paul Cezanne (FR); Bernard Y. Pucci, Cagnes sur mer (FR)

(73) Assignee: International Business Machines Corporation, Armonk, NY (US)

( * ) Notice: Subject to any disclaimer, the term of this patent is extended or adjusted under 35 U.S.C. 154(b) by 685 days.

(21) Appl. No.: 14/680,423

(22) Filed: Apr. 7, 2015

(65) Prior Publication Data
US 2015/0324269 A1    Nov. 12, 2015

(30) Foreign Application Priority Data

May 7, 2014   (GB) .................................. 1408007.1

(51) Int. Cl.
*G06F 11/34* (2006.01)
*G06F 11/30* (2006.01)
*G06F 9/445* (2018.01)

(52) U.S. Cl.
CPC ...... *G06F 11/3409* (2013.01); *G06F 9/44521* (2013.01); *G06F 11/3037* (2013.01); *G06F 11/3466* (2013.01); *G06F 2201/865* (2013.01)

(58) Field of Classification Search
CPC ............. G06F 11/3409; G06F 11/3037; G06F 11/3466; G06F 9/44521; G06F 2201/865
See application file for complete search history.

(56) References Cited

U.S. PATENT DOCUMENTS

| | | | |
|---|---|---|---|
| 5,394,545 | A | 2/1995 | Emrick et al. |
| 6,754,889 | B1 * | 6/2004 | Leverenz .............. G06F 9/445 714/E11.21 |
| 7,107,428 | B2 | 9/2006 | Cohen et al. |
| 7,636,918 | B2 | 12/2009 | Kadashevich |

(Continued)

FOREIGN PATENT DOCUMENTS

JP       2009032287 A     2/2009

OTHER PUBLICATIONS

"Sort Top by CPU Usage to Make It More Useful", May 13, 2011, Osxdaily, Available at http://osxdaily.com/2011/05/13/sort-top-by-cpu-usage/ (Year: 2011).*

(Continued)

*Primary Examiner* — Jacob D Dascomb
(74) *Attorney, Agent, or Firm* — Aaron Pontikos; Hoffman Warnick LLC

(57) ABSTRACT

A system, method and computer program product for estimating computer processing metrics for a target computer product or target computer process. A system is described including: a product name identifier for initiating execution of the method when a process requires a new memory page for a module and identifying a product associated with the module; a module page creator for creating a new memory page associated with the process and product; a module loader for loading the module into the new memory page as associated with the process and product; and wherein the total size of memory pages associated with a particular product can be determined.

20 Claims, 7 Drawing Sheets

---

Product Metric Method 350

352 Start

354 Estimate memory usage for a product from the memory page consumption for a product.

356 Estimate computer processing for a product from the memory page hit counts for a product 358 Provide estimates in table 360 End / Continue processing

(56) References Cited

U.S. PATENT DOCUMENTS

| | | | |
|---|---|---|---|
| 7,860,239 B2 | 12/2010 | Cerri et al. | |
| 8,473,607 B2 | 6/2013 | Enscoe et al. | |
| 2006/0123216 A1 | 6/2006 | Krauss et al. | |
| 2010/0174860 A1* | 7/2010 | Kim | G06F 12/0246 711/112 |
| 2010/0325149 A1 | 12/2010 | Etchegoyen | |
| 2011/0320682 A1* | 12/2011 | McDougall | G06F 12/023 711/6 |
| 2012/0131539 A1 | 5/2012 | Das | |
| 2012/0185776 A1 | 7/2012 | Kirshenbaum et al. | |
| 2013/0074051 A1 | 3/2013 | Freeman | |
| 2013/0212568 A1* | 8/2013 | Huang | G06F 8/458 717/146 |
| 2014/0351550 A1* | 11/2014 | Jun | G06F 12/023 711/173 |
| 2014/0379987 A1* | 12/2014 | Aggarwal | G06F 12/0215 711/133 |

OTHER PUBLICATIONS

Great Britain Intellectual Property Office, Search Report under Section 17(5) for Application GB1408007.1 dated Nov. 11, 2014, 3 pages.

Wikipedia, "Memory Management Unit," retrieved from http://en.wikipedia.org/wiki/Memory_management_unit on Feb. 18, 2015, 8 pages.

Wikipedia, "Memory Segmentation," retrieved from http://en.wikipedia.org/wiki/Memory_segmentation on Feb. 18, 2015, 4 pages.

Wikipedia, "Page Table," retrieved from http://en.wikipedia.org/wiki/Page_Table on Feb. 18, 2015, 12 pages.

Wikipedia, "Paging," retrieved from http://en.wikipedia.org/wiki/Paging on Feb. 18, 2015, 8 pages.

Santra et al., "Measurement of Memory Usage in J2EE Applications," Sep. 2009, pp. 786-788, Journal of Scientific & Industrial Research, vol. 68.

Wikipedia, "Virtual Memory," retrieved from http://en.wikipedia.org/wiki/Virtual_Memory on Feb. 18, 2015, 8 pages.

* cited by examiner

Product Page Engine 200

- Product Name Identifier 202
- Module Page Creator 204
- Module Loader 206
- Product Page Method 300

FIGURE 2A

Product Metric Engine 250

- Memory Usage Estimator 252
- Processing Estimator 254
- Product Metric Method 350

FIGURE 2B

Product Page Method 300

302 Start (process requires a new page for a module)

↓

304 Identify product id / product name for module

↓

306 Create new memory page associated with process and product

↓

308 Load module into memory page associated with process and product

↓

310 End / Continue processing

Product Metric Method 350

352 Start

↓

354 Estimate memory usage for a product from the memory page consumption for a product.

↓

356 Estimate computer processing for a product from the memory page hit counts for a product

↓

358 Provide estimates in table

↓

360 End / Continue processing

FIGURE 3B

> pds

| PID | %CPU | %MEM | VSZ | RSS | Product Name |
|---|---|---|---|---|---|
| 2641 | 1.2 | 10.1 | 1744 | 428 | IBM JVM |
| 2716 | 0.0 | 0.7 | 31888 | 16416 | WebSphere |
| 23993 | 2.0 | 28.8 | 631244 | 59108 | Constraint Optimizer |
| 2720 | 0.0 | 0.0 | 2652 | 1160 | CPLEX |
| 3795 | 0.0 | 0.0 | 0 | 0 | OPL |
| 6005 | 0.0 | 0.1 | 10420 | 3528 | CPLEX Studio |

>pds help

PID=product identifier
%CPU=percentage of CPU spent in this product PID
%MEM=percentage of memory used by this product code and data
VSZ=Virtual memory size of the product
RSS=Resident memory size of the product

> pds –process  ← All processes

| | Windows | Notes | Solver | Word My Doc | Server | Total |
|---|---|---|---|---|---|---|
| O/S | 800MB 20s | | | | | 800MB 20s |
| O/S Libs | 157MB 25s | 10MB 37s | 10MB 87s | 27MB 21s | 12MB 42s | 216MB 29s |
| JVM | | 92MB 67s | 157MB 2s | | | 249MB 69s |
| CPLEZ Studio | | | 10MB 12s | | | 10MB 12s |
| Eclipse | | 32MB 28s | 25MB 47s | | | 47MB 75s |
| OPL | | | 9MB 23s | | | 9MB 23s |
| CPLEX Solver | | | 20MB 12s | | | 20MB 12s |
| CPD | | | 318MB 24s | | | 318MB 24s |
| Apache | | | | | 23MB 12s | 23MB 12s |
| WebSphere | | | | | 17MB 35s | 17MB |
| Word | | | | 213MB 87s | | 213MB 87s |
| Total | 957MB 45s | 134MB 132s | 549MB 29s | 240MB 108s | 52MB 89s | 1.9GB 329s |

>

↑ All products  FIGURE 7

MEASUREMENT OF COMPUTER PRODUCT USAGE

FIELD OF THE INVENTION

This invention relates to a method and apparatus for measurement of computer product usage. In particular, this invention relates to a method and apparatus for measurement of a process by product memory use and processor use across multiple processes.

BACKGROUND

The ability to measure memory use and processor use remains an important endeavor. Software solutions are often delivered to end-users as bundles mixing different products. A single process executes several different software modules or programs, coming from different origins. In an operating system, the granularity of resource usage measurement is limited to a process and does not identify which product is actually used, e.g., program or library, and what is the proportion of each. Consequently, it is difficult to redistribute revenue proportionally to product usage. In this embodiment a product is taken as those program elements or modules that have been purposively grouped by someone or something. For instance, the following can be products: operating systems; Internet browsers; plugins for operating systems and browsers; data bundles; libraries; and software executables.

The following are hereby incorporated by reference. US patent publication 8473607 B2 disclosing a system and method for software usage. US patent publication 7636918 disclosing a system and method for tracking memory usage by software agents. US patent publication 2012/0131539 disclosing find and track information of interface usage of software libraries by other software. US patent publication 2012/0185776 disclosing analyzing resource consumption of software executing during a usage scenario. US patent publication 7107428 disclosing a memory usage tracking tool. US patent publication 2010/0325149 disclosing system and method for auditing software usage. US patent publication 7860239 disclosing a method and apparatus for metering usage of software products using multiple signatures. US patent publication 2013/0074051 disclosing tracking and analysis of usage of a software product.

BRIEF SUMMARY OF THE INVENTION

In a first aspect of the invention there is provided a system for estimating computer processing metrics for a process, said system comprising: a product name identifier for initiating execution of the method when the process requires a new memory page for a module and identifying a product associated with the module; a module page creator for creating a new memory page associated with the process and product; a module loader for loading the module into the new memory page as associated with the process and product; and wherein the total size of memory pages associated with a particular product can be determined. The process is one process of many linked processes in a process thread being measured externally of the above described method. The linked processes in the process thread correspond with a plurality of modules for execution code or data.

In a second aspect of the invention there is provided a method for estimating computer processing metrics for a process, said method comprising: initiating execution of the method when the process requires a new memory page for a module; identifying a product associated with the module; creating a new memory page associated with the process and product; loading the module into the new memory page as associated with the process and product; and wherein the total size of memory pages associated with a particular product can be determined.

Advantageously the method further comprises estimating a computer processing metric for the process from memory page hit counts for the product.

More advantageously the method further comprises estimating memory usage for a product from the size of memory page associated with the product.

Still more advantageously a product name is identified with a module and a product identifier is associated with the product name.

Yet more advantageously the product name is any string that allows recognition of the product. Preferably the string is one of: an executable file name for executable process; a dynamic link library name for libraries; a Jar file name; or a package name for a Java module. Java is a trademark in the US and/or other countries of Oracle Corporation.

More preferably the system and/or method is embodied in a computer operating system.

The embodiments have an effect that operates at a machine and/or operating system level of a computer below an overlying application and program level. The embodiments have an effect that results in the computer and in particular the memory management of a computer being made to operate in a new way such that execution detail of products can be monitored and tracked.

In a third aspect of the invention there is provided a computer program product for estimating computer processing metrics for software products, the computer operating program product comprising a computer-readable storage medium having computer-readable program code embodied therewith and the computer-readable program code configured to perform all the steps of the methods.

The computer program product comprises a series of computer-readable instructions either fixed on a tangible medium, such as a computer readable medium, for example, optical disk, magnetic disk, solid-state drive or transmittable to a computer system, using a modem or other interface device, over either a tangible medium, including but not limited to optical or analogue communications lines, or intangibly using wireless techniques, including but not limited to microwave, infrared or other transmission techniques. The series of computer readable instructions embodies all or part of the functionality previously described.

Those skilled in the art will appreciate that such computer readable instructions can be written in a number of programming languages for use with many computer architectures or operating systems. Further, such instructions may be stored using any memory technology, present or future, including but not limited to, semiconductor, magnetic, or optical, or transmitted using any communications technology, present or future, including but not limited to optical, infrared, or microwave. It is contemplated that such a computer program product may be distributed as a removable medium with accompanying printed or electronic documentation, for example, shrink-wrapped software, preloaded with a computer system, for example, on a system ROM or fixed disk, or distributed from a server or electronic bulletin board over a network, for example, the Internet or World Wide Web.

In a fourth aspect of the invention there is provided a computer program stored on a computer readable medium and loadable into the internal memory of a computer, comprising software code portions, when said program is run on a computer, for performing all the steps of the method claims.

In a fifth aspect of the invention there is provided a data carrier aspect of the preferred embodiment that comprises functional computer data structures to, when loaded into a computer system and operated upon thereby, enable said computer system to perform all the steps of the method claims. A suitable data-carrier could be a solid-state memory, magnetic drive or optical disk. Channels for the transmission of data may likewise comprise storage media of all descriptions as well as signal-carrying media, such as wired or wireless signal-carrying media.

BRIEF DESCRIPTION OF THE DRAWINGS

Preferred embodiments of the present invention will now be described, by way of example only, with reference to the following drawings in which:

FIGS. 2A and 2B are component diagrams of the preferred embodiment;

FIGS. 3A and 3B are flow diagrams of a process of the preferred embodiment;

FIG. 6 is an example screenshot of a command line interface from the preferred embodiment; and FIG. 7 is an example screenshot of a command line interface from a product table embodiment.

DETAILED DESCRIPTION OF THE EMBODIMENTS

Figure 1:
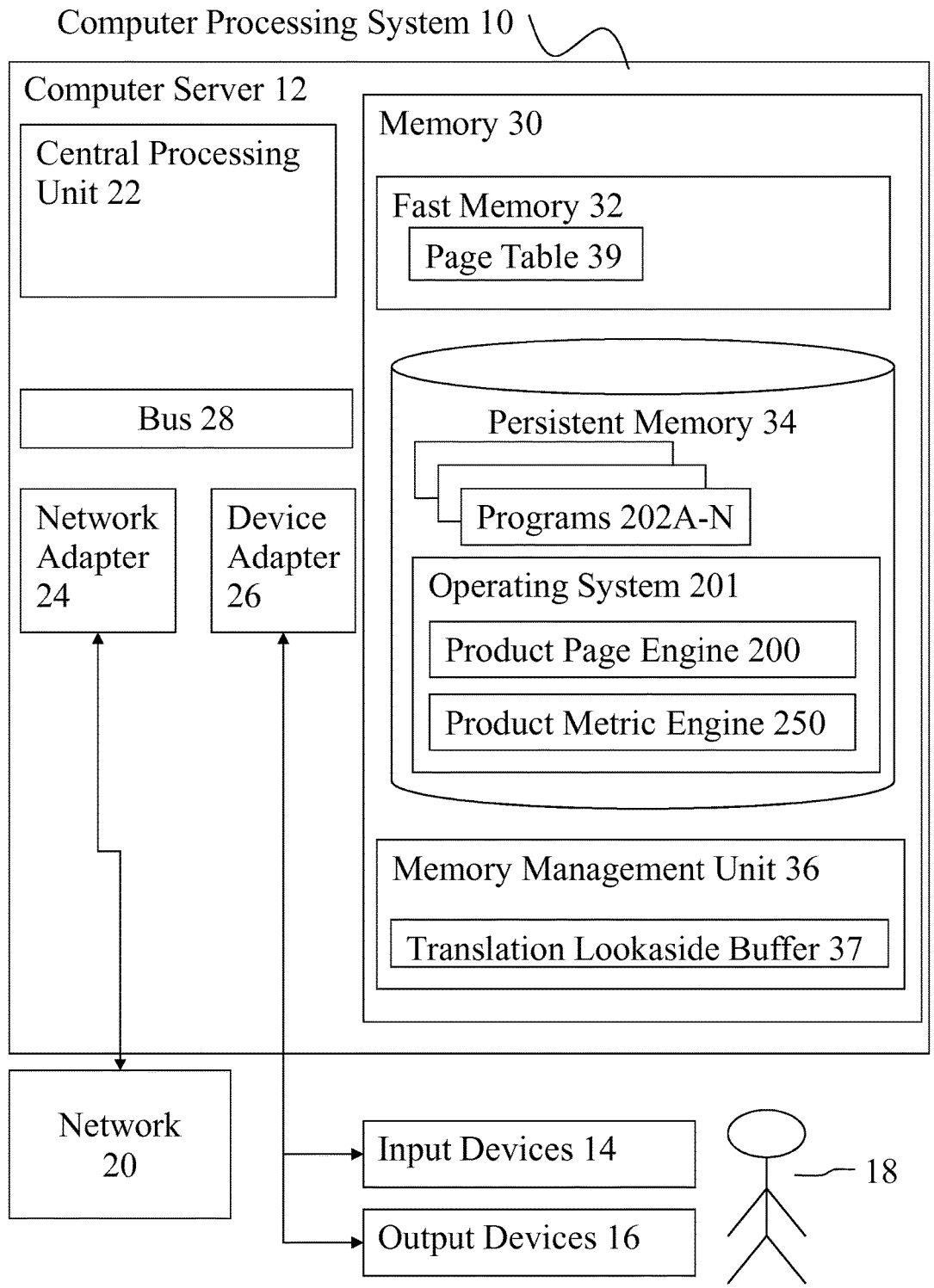
FIG. 1 is a deployment diagram of the preferred embodiment.

Referring to FIG. 1, the deployment of a preferred embodiment in computer processing system 10 is described. Computer processing system 10 is operational with numerous other general purpose or special purpose computing system environments or configurations. Examples of well-known computing processing systems, environments, and/or configurations that may be suitable for use with computer processing system 10 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices.

Computer processing system 10 may be described in the general context of computer system-executable instructions, such as program modules, being executed by a computer processor. Generally, program modules may include routines, programs, objects, components, logic, and data structures that perform particular tasks or implement particular abstract data types. Any program module can be a product and it is the intention of the module developer or owner that defines a product in terms of modules. Computer processing system 10 may be embodied in distributed cloud computing environments where tasks are performed by remote processing devices that are linked through a communications network. In a distributed cloud computing environment, program modules may be located in both local and remote computer system storage media including memory storage devices.

Computer processing system 10 comprises: general-purpose computer server 12 and one or more input devices 14 and output devices 16 directly attached to the computer server 12. Computer processing system 10 is connected to a network 20. Computer processing system 10 communicates with a user 18 using input devices 14 and output devices 16. Input devices 14 include one or more of: a keyboard, a scanner, a mouse, trackball or another pointing device. Output devices 16 include one or more of a display or a printer. Computer processing system 10 communicates with network devices (not shown) over network 20. Network 20 can be a local area network (LAN), a wide area network (WAN), or the Internet.

Computer server 12 comprises: central processing unit (CPU) 22; network adapter 24; device adapter 26; bus 28 and memory 30.

CPU 22 loads machine instructions from memory 30 and performs machine operations in response to the instructions. Such machine operations include: incrementing or decrementing a value in a register; transferring a value from memory 30 to a register or vice versa; branching to a different location in memory if a condition is true or false (also known as a conditional branch instruction); and adding or subtracting the values in two different registers and loading the result in another register. A typical CPU can perform many different machine operations. A set of machine instructions is called a machine code program, the machine instructions are written in a machine code language which is referred to a low level language. A computer program written in a high level language needs to be compiled to a machine code program before it can be run. Alternatively a machine code program such as a virtual machine or an interpreter can interpret a high level language in terms of machine operations.

Network adapter 24 is connected to bus 28 and network 20 for enabling communication between the computer server 12 and network devices.

Device adapter 26 is connected to bus 28 and input devices 14 and output devices 16 for enabling communication between computer server 12 and input devices 14 and output devices 16.

Bus 28 couples the main system components together including memory 30 to CPU 22. Bus 28 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Memory 30 comprises: computer system readable media in the form of fast memory 32; persistent memory 34; and memory management unit 36. Examples of fast memory 32 are random access memory (RAM) and cache memory that are volatile and not persistent. Computer processing system 10 may further include other removable and/or non-removable, volatile and/or non-volatile computer system storage media. By way of example only, persistent memory 34 can be provided for reading from and writing to a non-removable, non-volatile magnetic media (not shown and typically a magnetic hard disk or solid-state drive). Although not shown, further storage media may be provided including: an external port for removable, non-volatile solid-state memory; and an optical disk drive for reading from or writing to a removable, non-volatile optical disk such as a compact disk (CD), digital video disk (DVD) or Blu-ray. In such instances, each can be connected to bus 28 by one or more data media interfaces. As will be further depicted and described below, persistent memory 34 comprises programs 202A to 202N; and operating system 201. Operating system 201 comprises all the functionality for allowing programs 202A to 202N to execute and further comprises product page engine 200 and product metric engine 250.

Memory management unit 36 is a computer hardware unit that manages all CPU memory references, performing the translation of virtual memory addresses used by the CPU in to physical addresses of the fast memory 32 and also performing cache control between fast memory 32 and persistent memory 34. It can be implemented as part of the CPU for CPU cache memory but in the preferred embodiment it is formed as a separate device. Memory management unit 36 comprises translation lookaside buffer 37.

Translation lookaside buffer 37 is a cache of virtual and physical addresses mappings used by the memory management unit 36 that allows memory management unit 36 to perform repeated look ups internally without affecting fast memory access.

Product page engine 200 and product metric engine 250 are configured to carry out the functions of the preferred embodiment and are described in more detail below with respect to FIGS. 2A and 2B. Further modules that support the preferred embodiment, but are not shown, include firmware, boot strap program, and support applications. Each of the operating system, support applications, other program modules, and program data or some combination thereof, may include an implementation of a networking environment.

Computer processing system 10 communicates with at least one network 20 (such as a local area network (LAN), a general wide area network (WAN), and/or a public network like the Internet) via network adapter 24. Network adapter 24 communicates with the other components of computer server 12 via bus 28. It should be understood that although not shown, other hardware and/or software components could be used in conjunction with computer processing system 10. Examples, include, but are not limited to: microcode, device drivers, redundant processing units, external disk drive arrays, redundant array of independent disks (RAID), tape drives, and data archival storage systems.

Referring to FIG. 2A, product page engine 200 is for acquiring the data for the required metrics and comprises: a product name identifier 202; module page creator 204; a module loader 206; and a product page method 300.

Product name identifier 202 is for identifying the names of modules that form part of a product.

Module page creator 204 is for creating a memory page for an identified product module called by a process in the process thread being measured.

Module loader 206 is for loading a module into a memory page associated with its product and process.

Product page method 300 is the process for acquiring the data for the required metrics using the above components and is described in more detail with respect to FIG. 3A.

Referring to FIG. 2B, product metric engine 250 is for turning the acquired data into the required metrics and comprises: memory usage estimator 252; processing estimator 254; and product metric method 350.

Memory usage estimator 252 is for estimating memory usage by product based on memory page sizes associated with a product.

Processing estimator 254 is for estimating the processor usage based on memory page hits.

Product metric method 350 defines the process for turning the acquired data into the required metrics using the above described components and is described in more detail with respect to FIG. 3B.

Referring to FIG. 3A, product page method 300 comprises logical processes 302 to 310.

302 is the start of product page method 300 and is initiated when a process requires a new memory page for a module. For instance, when a process requires a particular memory access that is not available in existing memory pages then product page method 300 is called.

304 is for identifying a product identifier and/or product name for the required module required by the calling process. A scan of the module may reveal a product identifier pointer that points to a unique product identifier or name identifying the module as one that forms part of a group of modules for a product.

306 is for creating a new memory page associated with both the process and the product.

308 is for loading the module into the created memory page associated with calling process and the identified product.

310 is the end of the product page method for that process but the process thread can continue and another process may initiate the product page method. Typically a process in the process thread will again try to access the same memory location and this time the memory page exists and the memory management unit will return a physical address for the memory location and the memory page will received hit.

Referring to FIG. 3B, product metric method 350 comprises logical processes 352 to 360.

352 is the start of the product metric method 350 typically called when a user initiates a statistics request from the operating system command line.

354 is for estimating memory usage for a product from the memory page consumption for a product.

356 is for estimating computer processing for a product from the memory page hit counts for a product.

358 is for providing estimates grouped by product or in a table by product and process.

360 is the end of the method.

Figure 4:
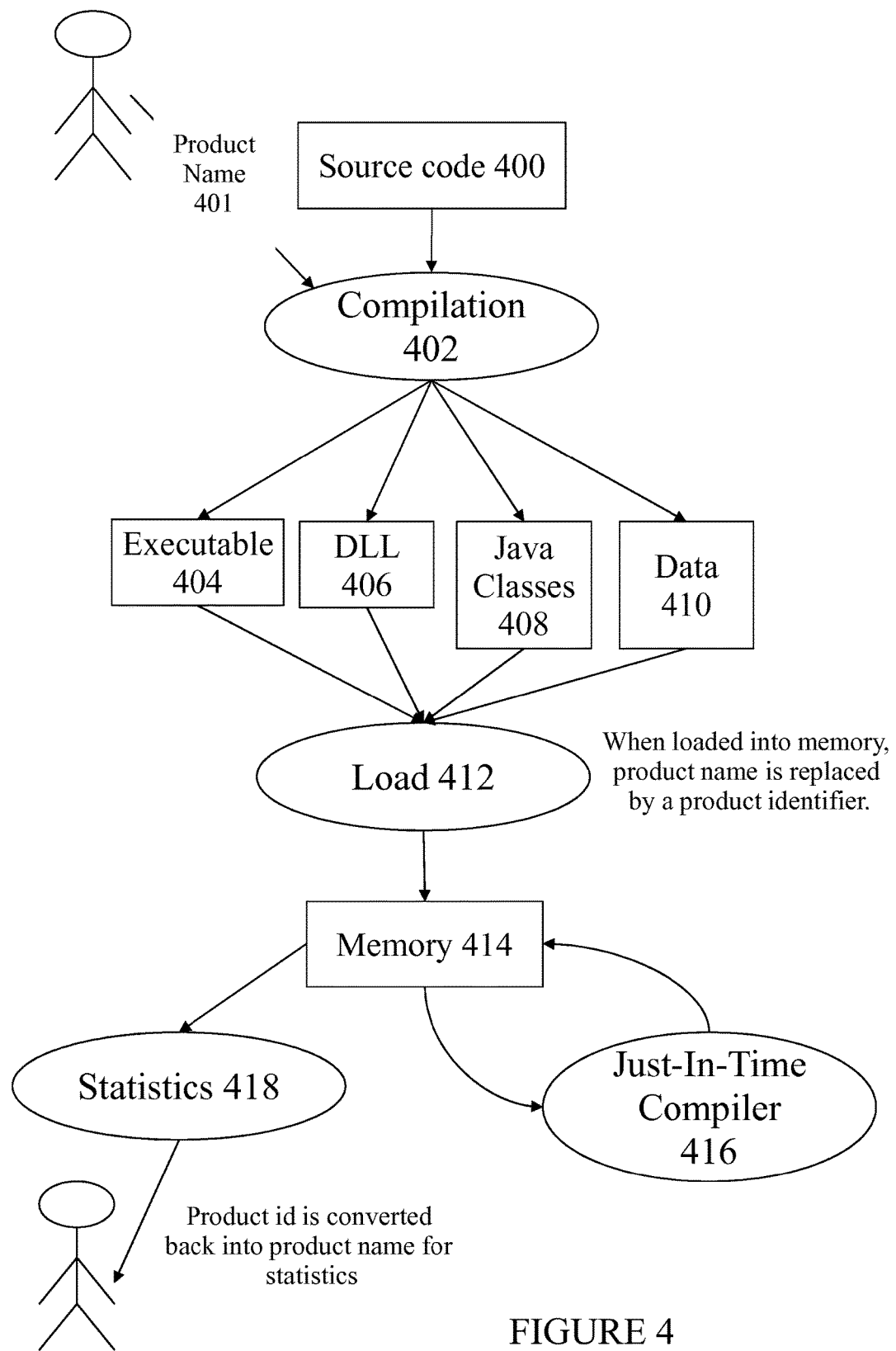
FIG. 4 is an example flow for associating components with a product.

Referring to FIG. 4, an example of source code with hard coded identifiers is described. Product owners wishing to use the embodiments will compile such products. A hard code identifier (product name 401) is compiled 402 into source code 400 into respective modules comprising (but not limited to): executable files 404; dynamic link libraries 406; Java classes 408 and data modules 410. Each module is hard coded with product name 401 in a format where the product name can be located and identified. Modules 404, 406, 408, 410 are loaded 412 into memory pages 414 associated with the product and the product name is replaced with a product identifier. Ultimately when statistics 418 are rendered then the product identifier is converted back into the product name. Some modules are still in source code or byte code form and are handled by just-in-time compiler 416 which is adapted to use the associated memory pages of the product for the compiled code.

Figure 5:
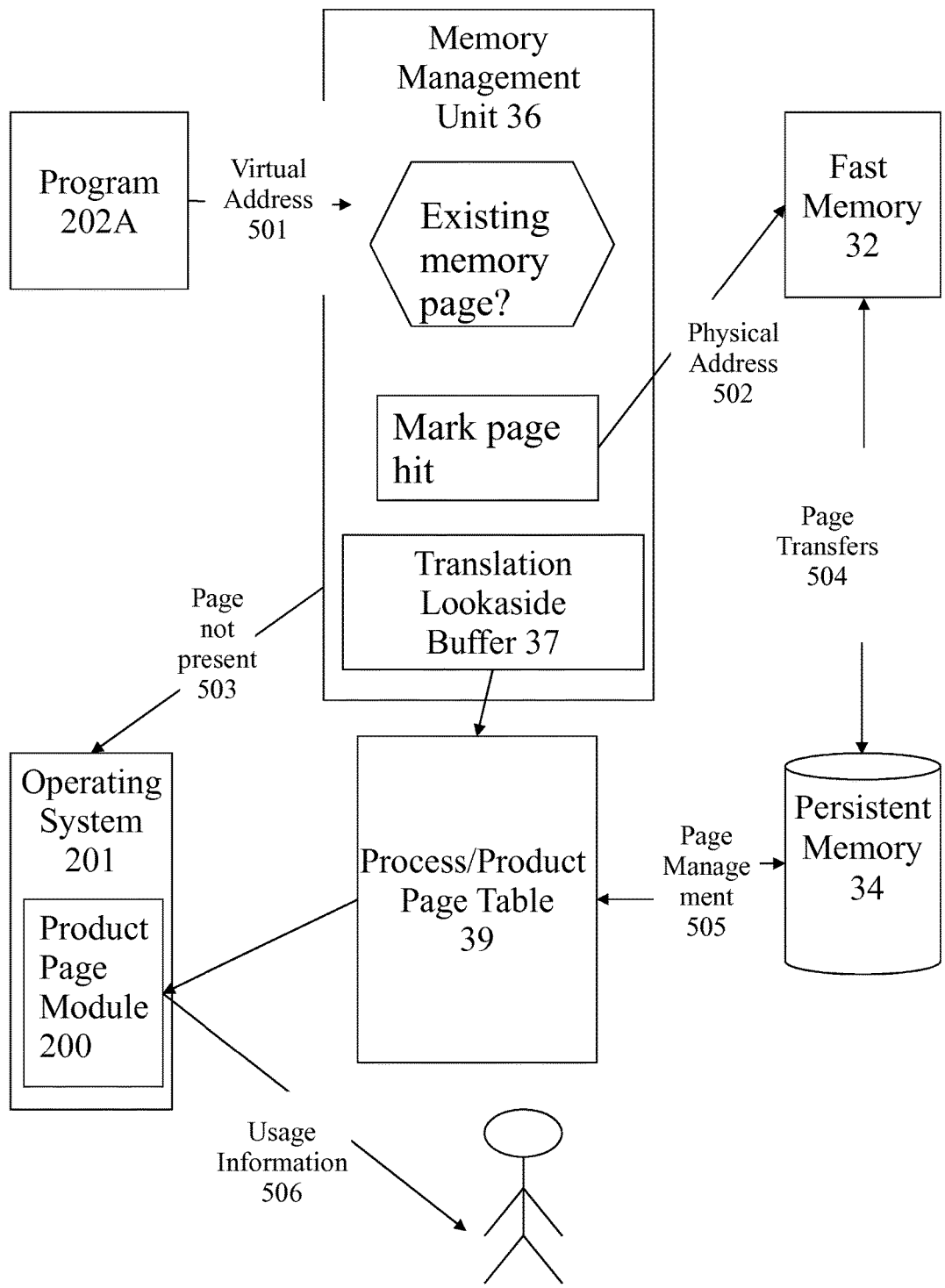
FIG. 5 is an example flow of messages between components of the preferred embodiment.

Referring to FIG. 5, an example operation of an adapted operating system is described. Memory management unit 36 is for converting (see arrows 501/502) virtual address used by program 202A to physical address used by the fast memory 32 using services of translation lookaside buffer 37 and memory pages 39A to 39N. If a page is not present then memory management unit 36 notifies (503) operating system 201. Page table 39 maintains mapping between memory pages (associated with products and processes), virtual addresses, physical memory addresses and pages transfers (504/505) swapped on persistent memory 34. Operating system 201 collects memory page usage information (506) on page table 39 to build resource usage statistics. Every time a memory page is created for a module, the product identifier or product name of the initiating program product is associated with the created memory page.

Referring to FIG. 6, product processing and memory usage metrics is described using an example screenshot of a command line interface from the preferred embodiment. In most Unix-like operating systems, a ps program (short for "process status"), when run in a command line interface, displays the currently-running processes. In the embodiment an adapted ps program is a pds program (short for "product status"). The pds program consolidates program statistics of executing modules displaying, for example: PID, % CPU, % MEM, VSZ, RSS and product name. Explanations of the column headings can be seen by requesting "pds help" on the command line. PID is a product identifier. % CPU is the percentage of CPU spent in this product PID. % MEM is a percentage of memory used by the product modules. VSZ is a virtual memory size of the product. RSS is the resident memory size of the product.

For example, Product identifier 2641 is for product IBM JAVA having 1.2% of CPU processing time and 10.1% of memory. Product identifier 2716 is for product WebSphere having 0% of CPU processing time and 0.7% of memory. Product identifier 23993 is for product Constraint Optimizer having 2% of CPU processing time and 28.8% of memory. Product identifier 2720 is for product CPLEX having 0% of CPU processing time and 0% of memory usage. Product identifier 3795 is for product OPL having 0% of CPU processing time and 0% of memory usage. Product identifier 6005 is for product CPLEX Studio have having 0% of CPU processing time and 0.1% of memory usage. IBM and WebSphere are trademarks of International Business Machines Corporation in the US and/or other countries.

FIG. 7 is an example screenshot of a command line interface from a product table embodiment that drills down into the processes that are used by each of the products. The expanded process metrics are supplied in table form by using a process tag with the PDS command. The left hand column lists all the example products: operating system (O/S); operating system library (O/S Libs); Java Virtual Machine (JVM); CPLEX Studio; Eclipse; OPL; CPLEX Solver; CPD; Apache; Web Apps; Word. The header row lists all the processes running as part of the products, for instance: Windows; Lotus Notes; Solver; Word My Doc; Server. The table cells show the memory used and CPU time estimated from the processes running as the product. The right hand column shows the total memory used and CPU time for each product whereby the total of all the processes for that product are added and displayed. The footer row shows the total memory used and CPU time for each process whereby the total memory used and CPU time of the process is added and displayed. The bottom right cell is the combined total memory used and combined total CPU time. Solver and Server are generic examples of software products. CPLEX and Lotus Notes are trademarks of International Business Machines Corporation in the US and/or other countries. Microsoft and Windows are trademarks of Microsoft Corporation in the US and/or other countries. Eclipse is an integrated development environment (IDE) made by the Eclipse Foundation. Apache HTTP Server is an Internet server made by the Apache Software Foundation.

For example, the operation system (O/S) uses 800 MB of memory and 20seconds CPU time for Windows processes. Operating system libraries (O/S Libs) use: 157 MB and 25s for Windows; 10 MB 57s for Notes; 10 MB and 87s for Solver; 27 MB and 21s for Word My Doc; 12 MB 42s for Server; and the total usage is 216 MB memory and 29s CPU. JVM uses: 92 MB and 67s for Notes; 157 MB and 2s for Solver; and the total usage is 249 MB memory and 69s CPU. CPLEZ Studio used 10 MB memory and 12s CPU for Solver. Eclipse uses: 32 MB and 28s for Notes; 25 MB and 47s for Solver; and total usage is 47 MB memory and 75s CPU. OPL uses 9 MB memory and 23s CPU for Solver. CPLEX Solver uses 20 MB memory and 12s CPU for Solver. CPD uses 318 MB and 24s for Solver. Apache uses 23 MB memory and 12s CPU for Server. Web Apps uses 17 MB memory and 12s CPU for Server. Word uses 213 MB memory and 87s CPU for Word My Doc. Windows total usage is 957 MB memory and 45s CPU. Notes total usage is 134 MB memory and 132s CPU. Solver total usage is 549 MB memory and 29s CPU. Word My Doc is 240 MB memory and 108s CPU. Server total usage is 52 MB memory and 89s CPU. Total of all memory usage is 1.9 GB and total of all CPU time is 329s.

Further embodiments of the invention are now described. It will be clear to one of ordinary skill in the art that all or part of the logical process steps of the preferred embodiment may be alternatively embodied in a logic apparatus, or a plurality of logic apparatus, comprising logic elements arranged to perform the logical process steps of the method and that such logic elements may comprise hardware components, firmware components or a combination thereof.

It will be equally clear to one of skill in the art that all or part of the logic components of the preferred embodiment may be alternatively embodied in logic apparatus comprising logic elements to perform the steps of the method, and that such logic elements may comprise components such as logic gates in, for example a programmable logic array or application-specific integrated circuit. Such a logic arrangement may further be embodied in enabling elements for temporarily or permanently establishing logic structures in such an array or circuit using, for example, a virtual hardware descriptor language, which may be stored and transmitted using fixed or transmittable carrier media.

In a further alternative embodiment, the present invention may be realized in the form of a computer implemented method of deploying a service comprising steps of deploying computer program code operable to, when deployed into a computer infrastructure and executed thereon, cause the computer system to perform all the steps of the method.

It will be appreciated that the method and components of the preferred embodiment may alternatively be embodied fully or partially in a parallel computing system comprising two or more processors for executing parallel software.

A further embodiment of the invention is a computer program product defined in terms of a system and method. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fibre-optic cable), or electrical signals transmitted through a wire.

Computer-readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibres, wireless transmission, routers, firewalls, switches, gateway computers and/or edge servers. A network adapter card or network interface in each computing/processing device receives computer-readable program instructions from the network and forwards the computer-readable program instructions for storage in a computer readable storage medium within the respective computing/processing device.

Computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the embodiments are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

The invention claimed is:

1. A system for estimating computer processing metrics for a computer product having a set of modules, comprising:
   a memory management unit that determines when a calling process requires a new memory page for a module of a product;
   a product name identifier that identifies the product associated with the module requiring the new memory page;
   a module page creator for creating the new memory page for the module of the identified product, the new memory page associated with the calling process and the identified product;

a module loader for loading the module into the new memory page as associated with the process and the product; and an estimating engine for:
  estimating memory usage and processor usage associated with the calling process and the identified product based on the new memory page for the module of the identified product,
  estimating at least one distinct memory usage and at least one distinct processor usage associated with at least one distinct process and the identified product, the at least one distinct process distinct from the calling process, and
  estimating a total memory usage and a total processor usage for the identified product by adding:
    the memory usage and the at least one distinct memory usage, and
    the processor usage and the at least one distinct processor usage.

2. The system according to claim 1 wherein the estimating engine estimates processor usage for the product from memory page hit counts for the product.

3. The system according to claim 2 wherein the estimating engine further estimates memory usage for the product from a size of memory page associated with the product.

4. The system according to claim 1 wherein a product name is identified with the module and a product identifier is associated with the product name.

5. The system according to claim 4 wherein the product name is any string that allows recognition of the product.

6. The system according to claim 5 wherein the string is an executable file name for executable process.

7. The system according to claim 5 wherein the string is a dynamic link library name for libraries.

8. The system according to claim 5 wherein the string is a Jar file name.

9. The system according to claim 5 wherein the string is a package name for a Java module.

10. A method for estimating computer processing metrics for a computer product having a set of modules, comprising:
  determining when a calling process requires a new memory page for a module of a product;
  identifying the product associated with the module in response to the new memory page being required by the module of the product;
  creating the new memory page for the module of the identified product, the new memory page associated with the calling process and identified product;
  loading the module into the new memory page as associated with the process and product;
  tracking memory page hits for the new memory page;
  estimating memory usage and processor usage associated with the calling process and the identified product based on the new memory page for the module of the identified product;
  estimating at least one distinct memory usage and at least one distinct processor usage associated with at least one distinct process and the identified product, the at least one distinct process distinct from the calling process; and
  estimating a total memory usage and a total processor usage for the identified product by adding:
    the memory usage and the at least one distinct memory usage, and
    the processor usage and the at least one distinct processor usage.

11. The method according to claim 10 further comprising estimating a computer processing metric for the product based on memory page hit counts associated with the product.

12. The method according to claim 11 further comprising estimating memory usage for the product from the size of the new memory page associated with the product.

13. The method according to claim 11 wherein a product name is identified with the module and a product identifier is associated with the product name.

14. The method according to claim 13 wherein the product name is any string that allows recognition of the product.

15. The method according to claim 14 wherein the string is an executable file name for executable process.

16. The method according to claim 14 wherein the string is a dynamic link library name for libraries.

17. The method according to claim 14 wherein the string is a Jar file name.

18. The method according to claim 14 wherein the string is a package name for a Java module.

19. A program product stored on a non-transitory computer readable storage medium, which when executed, estimates computer processing metrics for a product having a set of modules, the program product comprising:
  program code that determines when a calling process requires a new memory page for a module of a product;
  program code that identifies the product associated with the module in response to the new memory page being required by the module of the product;
  program code that creates the new memory page for the module of the identified product, the new memory page associated with the calling process and the identified product;
  program code that loads the module into the new memory page as associated with the process and product;
  program code that estimates memory usage and processor usage associated with the calling process and the identified product based on the new memory page for the module of the identified product;
  program code that estimates at least one distinct memory usage and at least one distinct processor usage associated with at least one distinct process and the identified product, the at least one distinct process distinct from the calling process; and
  program code that estimates a total memory usage and a total processor usage for the identified product by adding:
    the memory usage and the at least one distinct memory usage, and
    the processor usage and the at least one distinct processor usage.

20. The program product of claim 19, further comprising:
  program code for estimating a computer processing metric for the product based on memory page hit counts associated with the product; and
  program code for estimating memory usage for the product from the size of the new memory page associated with the product.

* * * * *